(12) United States Patent
Asanuma (10) Patent No.: US 6,256,561 B1
(45) Date of Patent: Jul. 3, 2001

(54) VEHICLE STEERING CONTROL SYSTEM

(75) Inventor: Nobuyoshi Asanuma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/414,545

(22) Filed: Oct. 8, 1999

(30) Foreign Application Priority Data

Oct. 12, 1998 (JP) .................................................. 10-304763

(51) Int. Cl.[7] .............................. G06F 7/00; G06F 17/00
(52) U.S. Cl. .............................. 701/41; 701/65; 701/72; 701/84; 180/197
(58) Field of Search .................................. 701/41, 65, 70, 701/72, 83, 84, 90; 180/197

(56) References Cited

U.S. PATENT DOCUMENTS

| 5,243,526 | * | 9/1993 | Ito et al. | ................................. | 701/90 |
| 5,255,192 | * | 10/1993 | Ito et al. | ................................. | 701/90 |
| 5,276,624 | * | 1/1994 | Ito et al. | ................................. | 701/72 |

FOREIGN PATENT DOCUMENTS

| 5-197423 | 8/1993 | (JP) . |
| 7-47970 | 2/1995 | (JP) . |
| 9-221054 | 8/1997 | (JP) . |

* cited by examiner

Primary Examiner—William A. Cuchlinski, Jr.
Assistant Examiner—Gertrude Arthur
(74) Attorney, Agent, or Firm—Arent Fox Kintner Plotkin & Kahn, PLLC (57) ABSTRACT

A system for controlling steering of a vehicle, including an electric motor used for power-steering torque assist control. The system has an navigation system whose output is used to correct the detected steering angle input by the vehicle driver. A desired yaw rate is determined based on the corrected steering angle and the detected vehicle speed using a yaw rate model, thereby enabling to conduct the aforesaid lane-keeping-steering torque assist control in a more appropriate manner. Further, if the vehicle driver expresses a positive intention to steer the vehicle by himself, for example, so as to avoid an obstacle present on the road, the control is discontinue to meet the wishes of the vehicle driver. Furthermore, the system monitors the steering of the vehicle driver to prevent the vehicle driver from relying upon this steering assist control to an excessive extent.

10 Claims, 6 Drawing Sheets

VEHICLE STEERING CONTROL SYSTEM

BACKGROUND OF THE INVENTION

1. Field of the Invention

This invention relates to a vehicle steering control system.

2. Description of the Related Art

The assignee proposes, in Japanese Laid-Open Patent Application No. Hei 7 (1995)-47970, a vehicle steering control system which calculates a desired running behavior of the vehicle, more specifically a desired yaw rate of the vehicle based on the detected vehicle speed and steering angle with the use of a yaw rate model, and calculates a desired course of travel based on the calculated desired yaw rate such that the steering torque (steering force) is assisted in response to an error between the desired course of travel and the actual course of travel determined from the detected yaw rate.

In addition to the above, the assignee proposes in Japanese Laid-Open Patent Application No. Hei 5(1993)-197423 and Hei 9(1997)-221054 etc. vehicle steering control systems which photo-sense and output image signals of the road ahead of the vehicle to detect white lines (defining lane boundaries of the road) and provide steering angle assistance such that the vehicle runs along the detected white lines.

By providing fine steering assistance while preventing vehicle lane wandering, these technologies greatly reduce the burden on the vehicle driver, which tends to increase particularly during long, high-speed driving on an expressway or the like.

Aside from the above, the range of navigation systems extends to embrace everything from simple orientation aids to guidance systems featuring automatic route determination. The navigation system has a road-map memory stored in a CD ROM or the like, and detects the instantaneous vehicle position by, for example, the GPS (Global Positioning System) satellite position system, and provides directional information on a road map including the detected instantaneous vehicle position.

SUMMARY OF THE INVENTION

An object of this invention is therefore to provide a vehicle steering control system which utilizes the navigation information and calculates the desired vehicle turning behavior (i.e., the desired yaw rate of the vehicle) based on the aforesaid yaw rate model, thereby enabling to conduct the aforesaid lane-keeping-steering torque assist control in a more appropriate manner.

In conducting such a steering assist control, however, if the vehicle driver expresses a positive intention to steer the vehicle by himself, for example, so as to avoid an obstacle present on the road, it will be preferable to meet the wishes of the vehicle driver.

A second object of this invention is therefore to provide a vehicle steering control system which utilizes the navigation information to conduct the lane-keeping-steering assist torque assist control in a more appropriate manner, and which, if the vehicle driver expresses a positive intention to steer the vehicle by himself, for example, so as to avoid an obstacle present on the road, can meet the wishes of the vehicle driver.

Further, although such a steering assistance control will greatly reduce the burden on the vehicle driver, the vehicle driver might sometimes rely upon this control to an excessive extent.

A third object of this invention is therefore to provide a vehicle steering control system which utilizes the navigation information to conduct the lane-keeping-steering torque assist control in a more appropriate manner, and which monitors the steering of the vehicle driver to prevent the vehicle driver from relying upon this steering assist control to an excessive extent.

In order to achieve this object, there is provided a system for controlling steering of a vehicle, comprising: an actuator which steers driven wheels of the vehicle; vehicle running condition detecting means for detecting running conditions of the vehicle including at least a turning behavior of the vehicle, a speed of the vehicle and a steering angle of the vehicle; steering torque detecting means for detecting a steering torque inputted by a driver of the vehicle; road detecting means for detecting a road ahead of the vehicle on which the vehicle is running; road condition information outputting means for outputting information of conditions of the road including at least a curvature of the road; steering angle correcting means for correcting the detected steering angle based on the detected road and the outputted information of the conditions of the road; desired vehicle turning behavior determining means for determining a desired turning behavior of the vehicle based on at least the corrected steering angle and the detected vehicle speed using a preset model; assist torque determining means for determining an error between the desired vehicle turning behavior and the detected vehicle turning behavior and for determining an assist torque for causing the vehicle to run along the road based on the determined error; and; manipulated variable determining means for determining a manipulated variable to be supplied to the actuator based on the determined assist torque.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
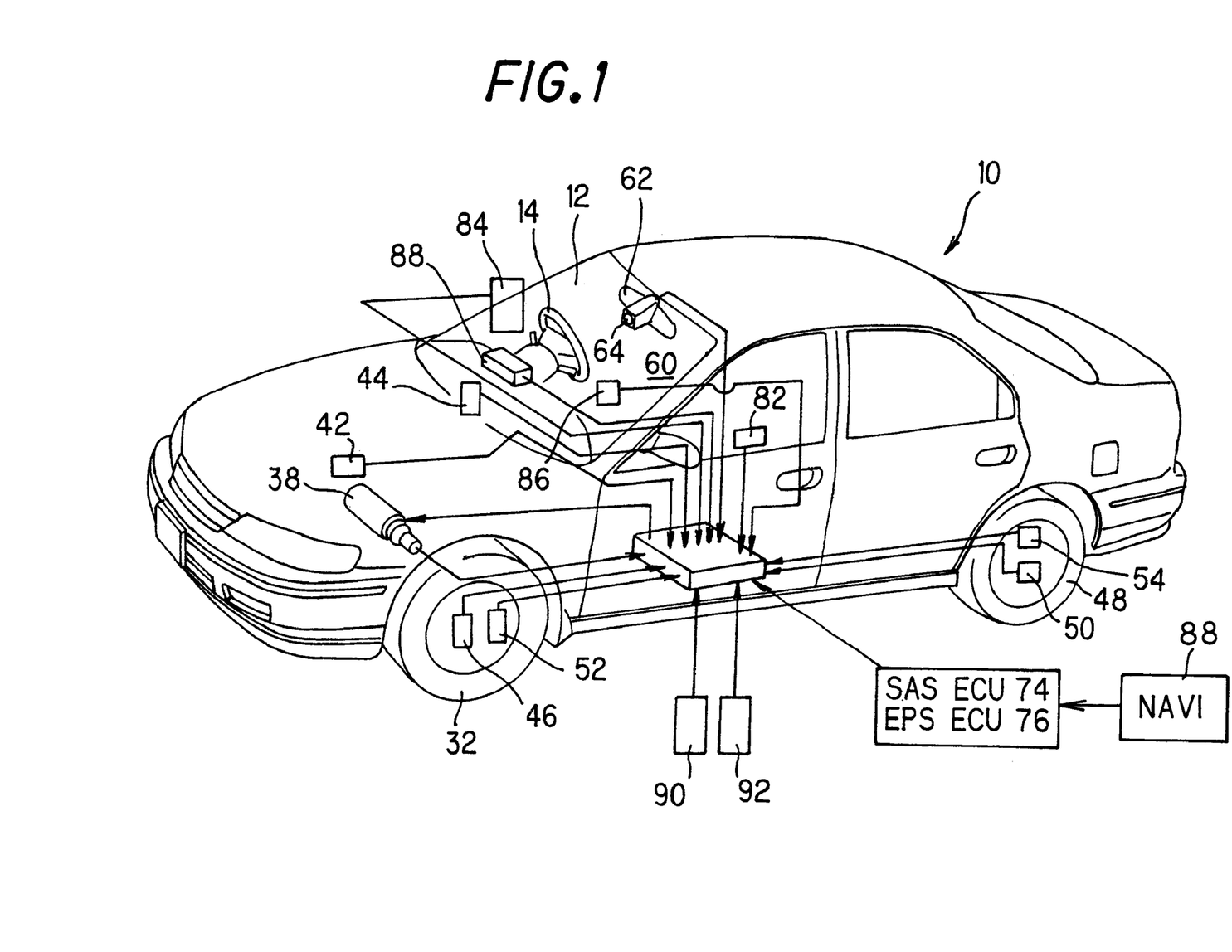
FIG. 1 is an overall schematic view showing the overall configuration of a vehicle steering control system according to the present invention.
Figure 2:
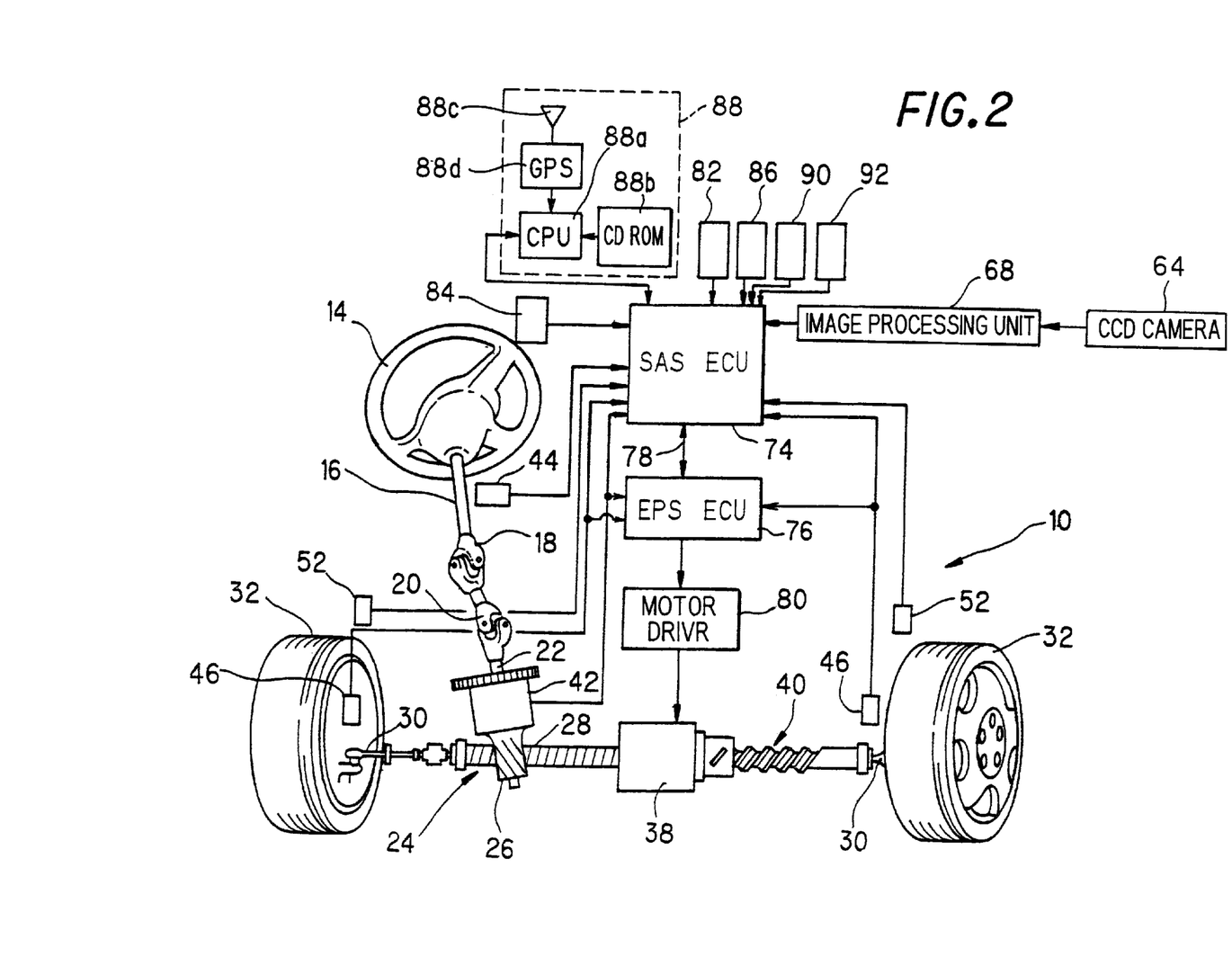
FIG. 2 is an explanatory view showing the configuration of a steering mechanism illustrated in FIG. 1.

FIG. 1 is an overall schematic view of a vehicle steering control system according to this invention. FIG. 2 is an explanatory view of the system with particular focus on the steering mechanism.

As shown in FIGS. 1 and 2, a steering wheel 14 located at the vehicle driver's seat 12 of a vehicle 10 is connected to a steering shaft 16 that is in turn connected through universal joints 18, 20 to a connecting shaft 22.

The connecting shaft 22 is connected to a pinion 26 of a rack-and-pinion steering gear assembly 24. The pinion 26 is engaged with a rack 28. Rotary motion inputted from the steering wheel 14 by the vehicle driver passes through the pinion 26 to be converted into linear motion of the rack 28. The linear motion passes through tie rods (steering rods) 30, 30 at the opposite ends of the front axle to turn two front wheels (steered wheels) 32, 32 in the desired direction around the associated king pins (not shown).

An electric motor 38 and a ball-screw mechanism 40 are disposed coaxially with the rack 28. The output of the motor 38 is converted into linear motion of the rack 28 by a ball-screw mechanism 40 so as to move the rack 28 in the direction that reduces or assists the steering force (steering torque) inputted through the steering wheel 14 by the vehicle driver.

A torque sensor 42 provided in the vicinity of the rack-and-pinion steering gear 24 outputs a signal indicating the direction and magnitude of the steering force (steering torque) inputted by the vehicle driver. A steering angle sensor 44 provided in the vicinity of the steering shaft 16 outputs a signal indicating the direction and magnitude of the steering angle θ (more precisely the front wheel steering angle) inputted by the vehicle driver. The steering angle sensor 44 is a rotary encoder or the like.

Wheel speed sensors 46, 46 situated in the vicinity of each of the front wheels 32, 32 and wheel speed sensors 50, 50 (FIG. 1; only one shown) situated in the vicinity of each of two rear wheels 48, 48 (only one shown), output signals once every predetermined angle of rotation of the associated front and rear wheels. The wheel speed sensors 46, 46 and 50, 50 are magnetic pickups or the like. The front wheels 32, 32 are driven wheels powered by an engine (not shown) mounted at the front of the vehicle 10. The rear wheels 48, 48 are idle.

A vehicle height sensor 52 is provided in the vicinity of the suspension mechanism (not shown) of each front wheel 32 and a vehicle height sensor 54 is provided in the vicinity of the suspension mechanism (not shown) of each rear wheel 48. Based on the stroke (displacement) of the associated suspension mechanism, each height sensor outputs a signal indicating the height of the vehicle 10 at the sensor location.

As shown in FIG. 1, a single monocular CCD (Charge-Coupled Device) camera 64 combined with rear-view mirror 62 is attached to the inner surface of the windshield 60 above the vehicle driver's seat 12. The CCD camera 64 is dedicated to photo-senses and outputs an image signal of the road ahead of the vehicle 10. As shown in FIG. 2, the image signal outputted by the CCD camera 64 is forwarded to an image processing ECU (Electronic Control Unit) 68, comprised of a microcomputer, that extracts the lane boundaries (white lines painted on the road and defining lanes) from the image signal.

The vehicle steering control system according to this invention also has an Electronic Control Unit (shown as "SAS ECU") 74, similarly comprised of a microcomputer. The outputs of the image processing ECU 68, and the torque sensor 42 etc., are inputted to the SAS ECU 74.

The system is also equipped with a second Electronic Control Unit (shown as "EPS ECU") 76 also comprised of a microcomputer. The outputs of the torque sensor 42 and the wheel speed sensor 46 are inputted to the EPS ECU 76.

The SAS ECU 74 and the EPS ECU 76 are connected to be able to communicate with each other through a signal line 78. The SAS ECU 74 calculates a lane-keeping-steering assist torque as explained later and forwards the same to the EPS ECU 76.

The EPS ECU 76 calculates a power-steering assist torque and based on the calculated power-steering assist torque and the forwarded lane-keeping-steering assist torque, calculates a final steering assist torque. Then, based on the calculated final steering assist torque, it calculates or determines a manipulated variable (motor current) to be supplied to the electric motor 38.

The EPS ECU 76 is connected to a motor driver 80. The motor driver 80 is equipped with a known bridge circuit (not shown) composed of four power FET switching devices, the on/off state of which determines the direction in which the electric motor 38 will drive.

The EPS ECU 76 calculates or determines the motor current (manipulated variable) in duty ratio in terms of PWM (pulse-width modulation) and outputs it to the motor driver 80. Thus, the EPS ECU 76 duty-ratio controls the FET switching devices to regulate the motor current such that the electric motor 38 generates the required assist torque.

A yaw rate sensor 82 is installed at a location near the center of gravity of the vehicle 10. The yaw rate sensor 82 outputs a signal indicating the yaw rate (angular velocity of yaw) γ around the vertical axis (the axis of gravity) at the center of gravity of the vehicle 10.

An appropriate number of tactile pressure sensors 84 provided on the steering wheel 14 output pressure signals indicating whether or not the vehicle driver is manipulating the steering wheel 14. An appropriate number of second tactile pressure sensors 86 installed under the vehicle driver's seat output signals indicating whether or not the vehicle driver is seated.

Moreover, this system is equipped with a navigation system 88 (illustrated as "NAVI" in FIG. 1). The navigation system 88 has a CPU 88a, a CD ROM 88b which stores the navigation information comprising numerous sets of nodes (coordinate positional information) indicative of places where the vehicle 10 is expected to travel, and a GPS (Global Positioning System) receiver 88d which receives the signal from the GPS satellite position system through an antenna and detects the instantaneous position of the vehicle 10.

The CPU 88a of the navigation system 88 and the SAS ECU 74 are connected to be able to communicate with each other, and the SAS ECU 74 receives the aforesaid navigation information comprising numerous sets of nodes outputted by the navigation system 88. Based on the inputted information, the SAS ECU 74 determines the conditions of road including at least the curvature R of the road on which the vehicle 10 is running and corrects the detected steering angle θ by the calculated value, as will be explained later. Thus, the navigation system 88 outputs the information of conditions of the road including at least the curvature of the road.

A brake switch 90 associated with the brake pedal (not shown) near the floor at the vehicle driver's seat 12 outputs a signal indicating the depression of the brake pedal by the vehicle driver. An accelerator position sensor 92 associated with the accelerator pedal (not shown) outputs a signal indicating the amount of depression of the accelerator pedal by the vehicle driver.

Figure 3:
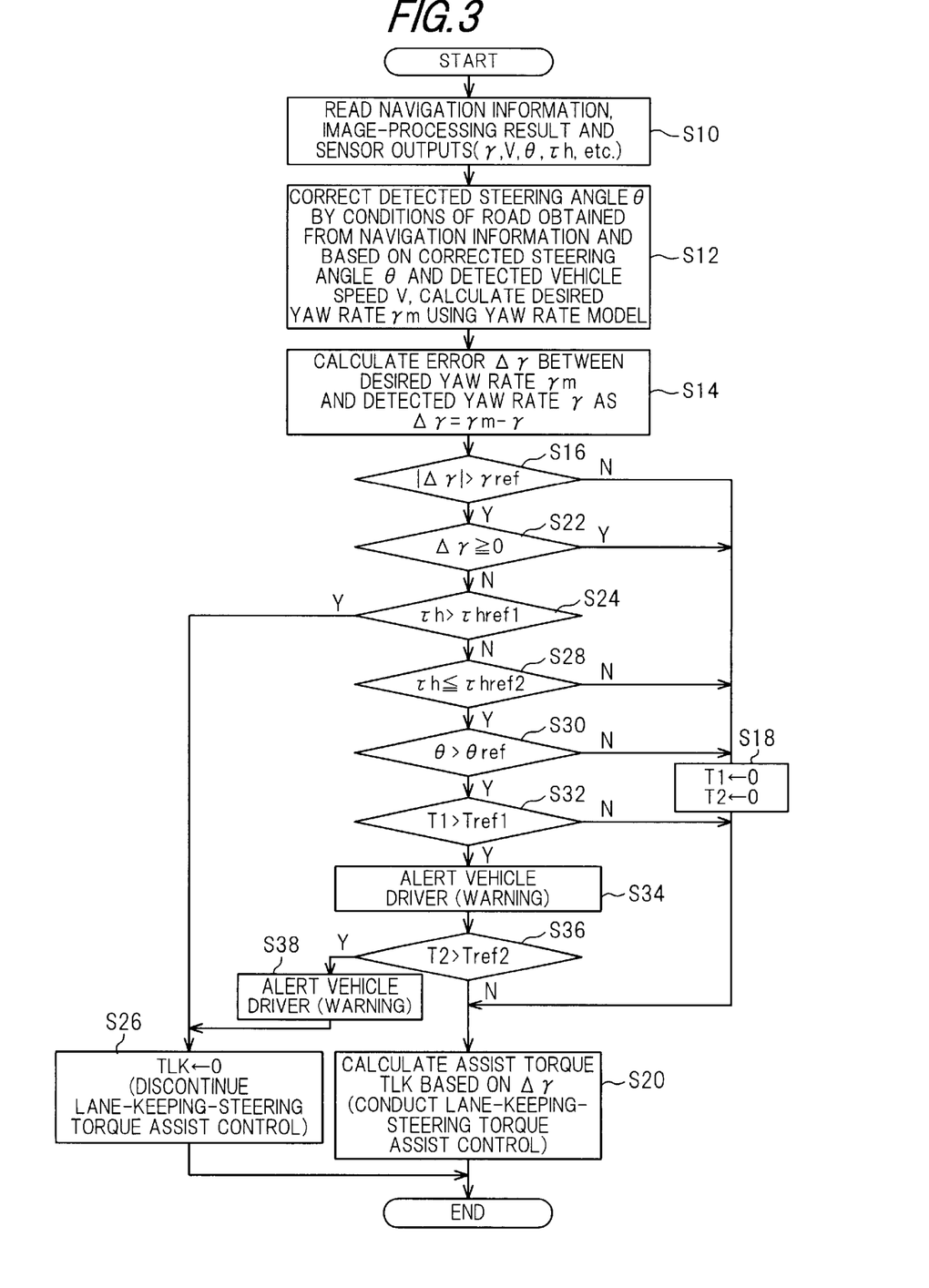
FIG. 3 is a flow chart showing the operation of the system illustrated in FIG. 1.

FIG. 3 is a flow chart showing the operation of the vehicle steering control system according to this invention.

Figure 4:
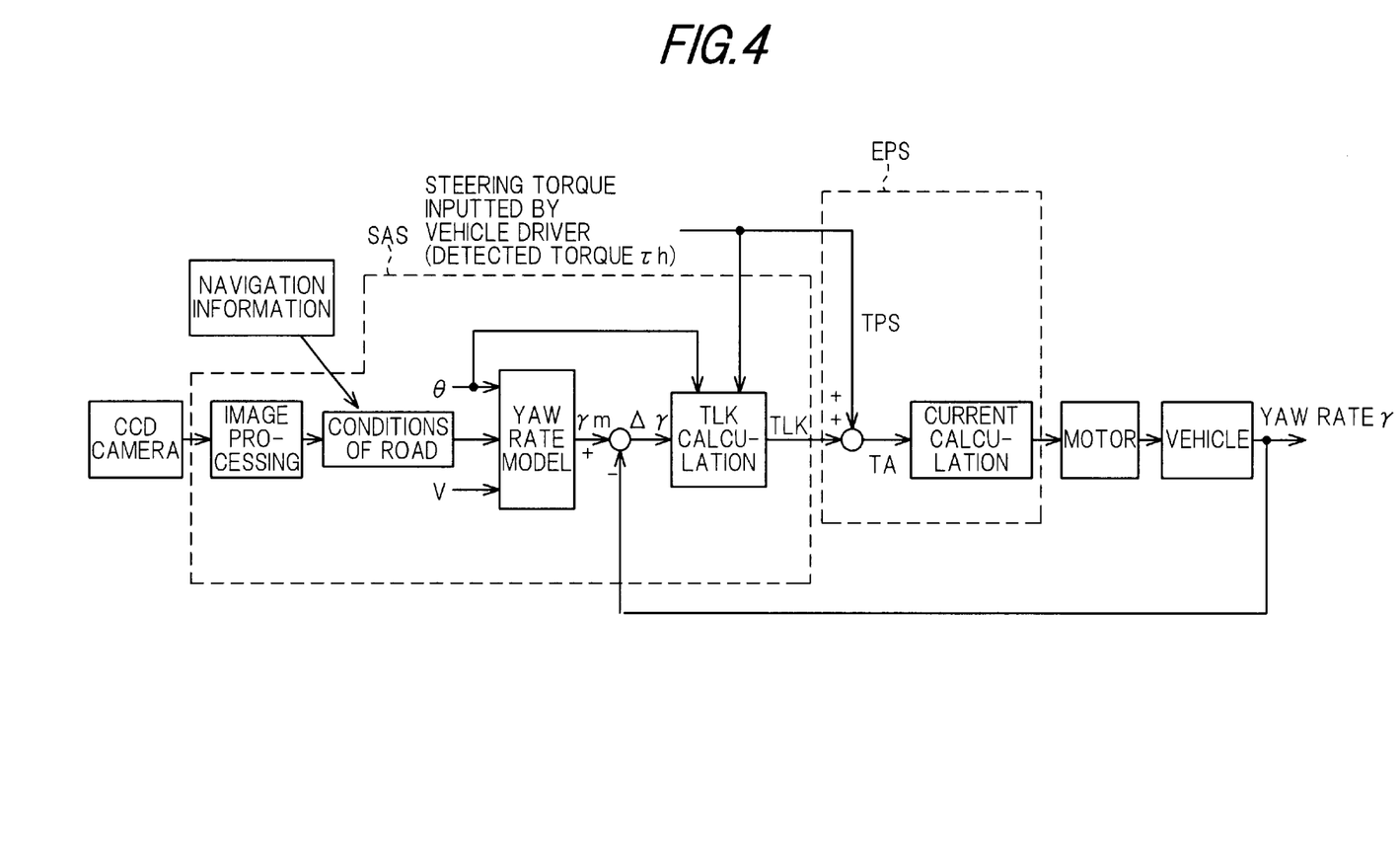
FIG. 4 is a block diagram showing functionally the operation of the system conducted by an SAS ECU and an EPS ECU, in particular a lane-keeping-steering assist torque control conducted by the SAS ECU illustrated in FIG. 2.

Before entering the explanation of the flow chart, the operation of the system will be outlined with reference to a block diagram of FIG. 4.

In FIG. 4, the block illustrated as "SAS" shows the operation carried out by the SAS ECU 74, while the block illustrated as "EPS" shows that carried out by the EPS ECU 76.

As illustrated in the figure, the output of the CCD camera 64 is inputted to the image processing ECU 68, where white lines defining the lane boundaries of the lane (road) on which the vehicle 10 is running are detected by image processing.

At the same time, the navigation information comprising sets of nodes (coordinate positional information) at that place (road) are outputted to the SAS ECU 74 from the navigation system 88. The SAS ECU 74 selects two or more nodes (adjoining to each other) from among the sets of nodes and determines the conditions of road including at least the curvature R of the road. It can be stated, thus, the navigation system 88 outputs the information of conditions of the road including at least the curvature of the road.

Figure 5:
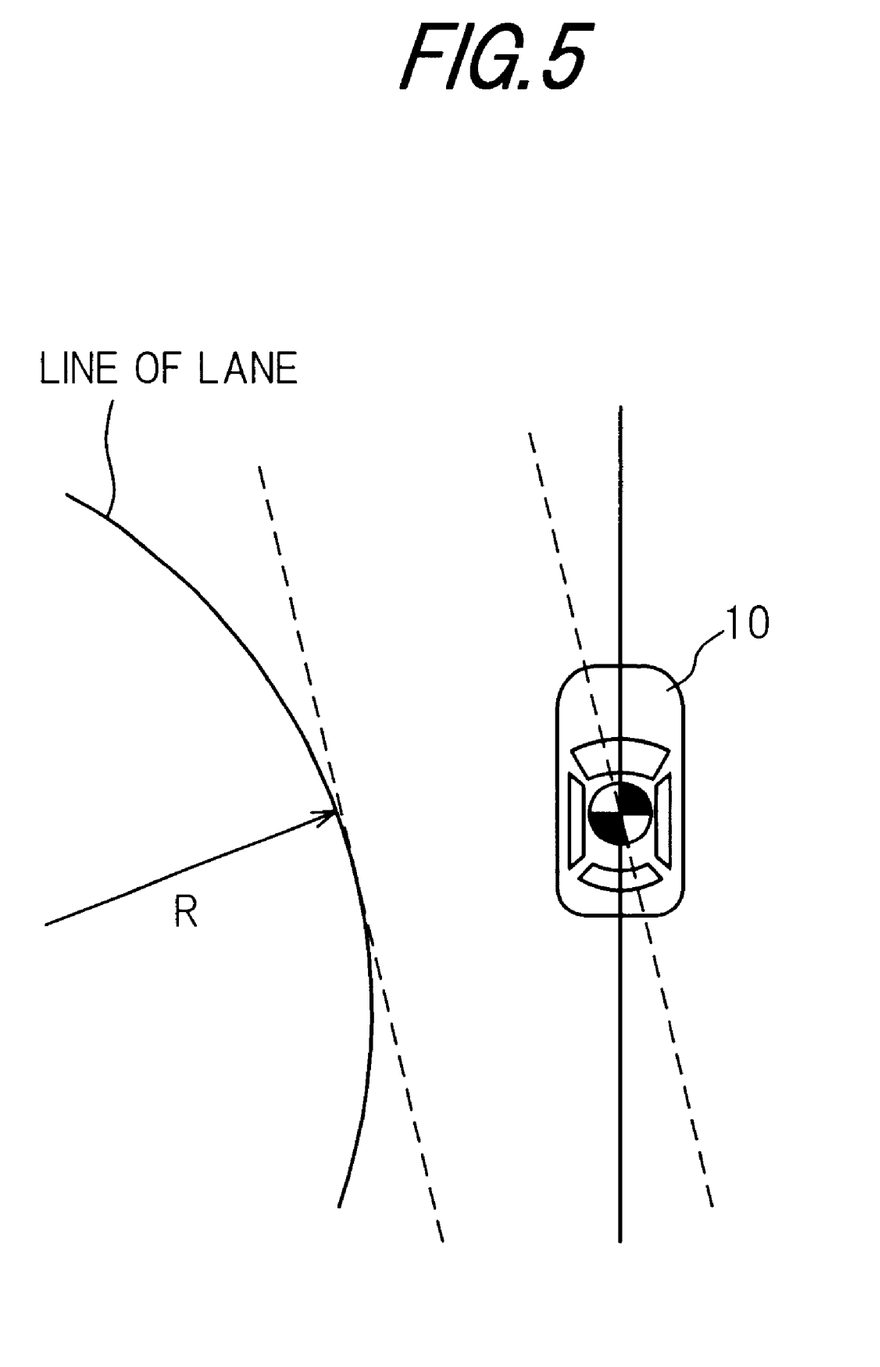
FIG. 5 is an explanatory view showing the result of the lane-keeping-steering torque assist control illustrated in FIG. 4 and conducted on a road (lane) having the curvature R.

FIG. 5 shows the curvature R of lane (road) determined based on the navigation information. The SAS ECU 74 corrects the detected steering angle e (the steering angle of the front wheels 32) based on the conditions of road, i.e., the curvature R of the lane (road). Thus, the SAS ECU 74 corrects the detected steering angle based on the detected road (lane) and the outputted information of the conditions of road.

Returning to the explanation of FIG. 4, the SAS ECU 74 calculates or determines a desired yaw rate (desired vehicle turning behavior) γm. Specifically, the SAS ECU 74 has a yaw rate model which receives the corrected steering angle θ and the detected vehicle speed V as the inputs and produces the output indicative of the desired yaw rate γm. The yaw rate model is expressed by the following equation.

$$\gamma m = \theta \cdot V / ((1 + A \cdot V^2) \cdot L)$$

In the above, L indicates the wheelbase length of the vehicle 10 which is calculated beforehand and is stored in a memory (not shown) of the SAS ECU 74. A indicates the stability factor and is calculated by the following equation.

$$A = (-M/2L^2) \cdot (Lf \cdot Kf - Lr \cdot Kr) / Kf \cdot Kr$$

In the above, M: the moment of inertia of the vehicle 10; Lf: the distance between the center of gravity of the vehicle 10 and the front wheels 32, Kf: the cornering force of the front wheels 32; Lr: the distance between the center of gravity of the vehicle 10 and the rear wheels 48; Kr: the cornering force of the rear wheels 48. These values are calculated beforehand and stored in the memory of the SAS ECU 74.

Next, the SAS ECU 74 calculates the error or difference Δγ between the calculated desired yaw rate γm and the detected actual yaw rate γ. The SAS ECU 74 then multiplies the calculated error by an appropriate gain (not shown in the figure) and based on the product, determines or calculates a lane-keeping-steering assist torque for causing the vehicle 10 to run along the center (or in the vicinity thereof) of the lane defined by lane boundaries. This assist torque is hereinafter referred to as "assist torque TLK". By conducting this control, as illustrated in FIG. 5, even if the vehicle 10 is assumed to have been heading, for example, toward the direction shown by the solid line, the steering of the vehicle 10 is assisted such that the vehicle turns towards the direction shown by dashed lines determined by the line of the lane.

In the control illustrated in FIG. 4, when the steering torque τh is detected, in other words, if the vehicle driver inputs the steering torque, the EPS ECU 76 multiples the detected steering torque τh by an appropriate gain (not shown in the figure) and based on the product, determines or calculates a power-steering assist torque (hereinafter referred to as "assist torque TPS"). This assist torque TPS is the torque assistance when the vehicle driver shows a positive intention to steer the vehicle 10 by himself, for example, so as to avoid an obstacle present on the road.

Further, as illustrated in FIG. 4, the actuator (i.e., the electric motor 38) for the conventional power-steering torque assist control is also used in the lane-keeping torque assist control, thereby rendering the configuration of the system simple.

Figure 6:
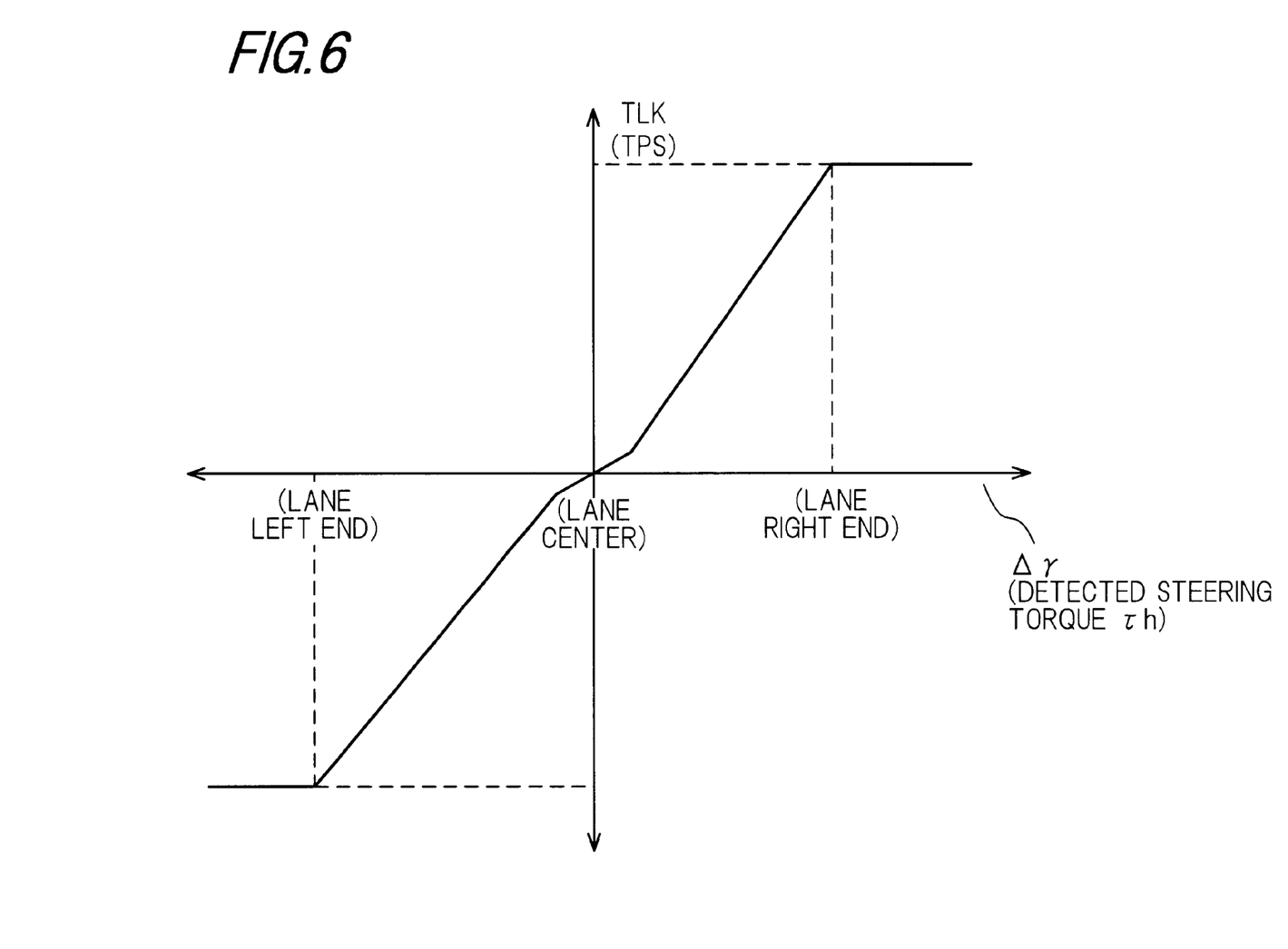
FIG. 6 is a graph showing the characteristics of steering assist torque determined by the SAS ECU and/or the EPS ECU illustrated in FIG. 4.

FIG. 6 is an explanatory graph illustrating the characteristics of the assist torque TLK and/or TPS. As illustrated in the figure, with the controls illustrated in FIG. 4, the assist torque TLK and/or TPS is generated in response to the error Δγ or the detected torque τh, as shown. The assist torque TLK is subjected to correction based on the vehicle-driver-inputting torque (detected torque τh) and the detected steering angle θ, which will later be explained in detail.

Based on the above, the operation of the vehicle steering control system according to the invention will be explained with reference to FIG. 3.

The program begins in S10 in which the aforesaid navigation information, the image processing result and the sensor outputs (e.g., the yaw rate γ, the vehicle speed V, the steering angle θ, the vehicle-driver-inputting torque τh inputted by the vehicle driver) are read.

The program then proceeds to S12 in which the detected steering angle θ is corrected by the conditions of road (i.e., the curvature R) obtained from the navigation information, and the desired yaw rate γm is determined by inputting the corrected steering angle θ and the detected vehicle speed V in the yaw rate model (equation) and by obtaining the output of the model.

The program then proceeds to S14 in which the error Δγ between the desired yaw rate γm and the detected yaw rate γ is calculated or determined.

The program then proceeds to S16 in which it is determined or discriminated whether the absolute value of the calculated error Δγ exceeds a predetermined reference value γref. When the result is negative, since this indicates that the vehicle 10 is running along the center (or in the vicinity thereof) of the lane (road), the program proceeds to S18 in which timers (up-counters) T1, T2 (explained later) are set to zero (i.e., are started to measure time lapse).

The program proceeds to S20 in which the assist torque TLK is calculated or determined based on the calculated error Δγ in accordance with the characteristicsshown in FIG. 6.

On the other hand, when the result in S16 is affirmative, the program proceeds to S22 in which it is determined or discriminated whether the calculated error Δγ is greater or equal to zero, in other words, it is determined or discriminated whether the calculated error Δγ is a positive value indicating that the actual yaw rate is less than the desired yaw rate, or whether the calculated error Δγ is a negative (minus) value indicating that the actual yaw rate is greater than the desired yaw rate.

When the result in S22 is affirmative, since this indicates that the actual yaw rate is less than the desired yaw rate, the program proceeds, via S18, to S20 in which the assist torque TLK is calculated based on the error Δγ.

When the result in S22 is negative, since this indicates that the actual yaw rate is greater than the desired yaw rate, the program proceeds to S24 in which it is determined or discriminated whether the detected torque τh exceeds a predetermined first torque τhref1. The predetermined first torque τhref1 should be a value (e.g., 10 kgf·cm) which makes it possible to estimate that the vehicle driver has the positive intention to steer the vehicle by himself, for example, so as to avoid an obstacle present on the road. Such a value should be predetermined in advance.

When the result in S24 is affirmative, since this indicates that the vehicle driver has the positive intention to steer the vehicle by himself, the program proceeds to S26 in which the assist torque TLK is made zero, in other words, the lane-keeping-steering torque assist control is discontinued, so as to prevent the lane-keeping-steering torque assist control from interfering with the vehicle driver's positive steering. As a result, as will be illustrated in FIG. 4, the EPS ECU 76 calculates or determines the assist torque TPS based on the detected torque τh in accordance with the characteristics shown in FIG. 6 such that the vehicle driver's steering is assisted.

When the result in S24 is negative, on the other hand, the program proceeds to S28 in which it is determined or discriminated whether the detected torque τh exceeds a predetermined second torque τhref2. The predetermined second torque τhref2 should be a value (e.g., 5 kgf·cm) which makes it possible to estimate if the vehicle driver is relying upon the lane-keeping-steering torque assist control to an excessive extent and that he is grasping the steering wheel 14 with only a slight gripping force. Such a value should also be predetermined in advance.

When the result in S28 is negative, since this indicates that the vehicle driver is not relying upon the lane-keeping-steering torque assist control to an excessive extent, the program proceeds, via S18, to S20 in which the assist torque TLK is calculated based on the error Δγ.

On the other hand, when the result in S28 is affirmative, since this indicates that the vehicle driver is relying upon the lane-keeping-steering torque assist control to an excessive extent, the program proceeds to S30 in which it is determined or discriminated, as a precaution, whether the detected steering angle θ exceeds a predetermined steering angle θref. This predetermined steering angle θref should be a value (e.g., 5 degrees) which makes it possible to estimate if the vehicle driver is relying upon the lane-keeping-steering torque assist control. This value should also be predetermined in advance.

When the result in S30 is negative, since this indicates that the vehicle driver is not relying on the lane-keeping steering torque assist control to an excessive extent, the program proceeds, via S18, to S20 in which the assist torque TLK is calculated based on the error Δγ.

On the other hand, when the result in S30 is affirmative, the program proceeds to S32 in which it is determined whether the value of the timer T1 is greater or equal to a predetermined first time Tref1 (e.g., 2 sec.), and when the result is negative, the program proceeds to S20. When the result in S32 is affirmative, the program proceeds to S34 in which the vehicle driver is alerted or warned such that this is called to his attention. More specifically, an audio alarm such as a buzzer (not shown in the figures) is operated to make a sound, while a visible indicator (not shown in the figures) is operated to flash such that the vehicle driver is directed to clutch the steering wheel 14.

The program then proceeds to S36 in which it is determined or discriminated whether the value of the timer T2 is greater or equal to a predetermined second time Tref2 (e.g.e, 5 sec.) and when the result is negative, the program proceeds to S20.

On the other hand, when the result in S36 is affirmative, the program proceeds to S38 in which the vehicle driver is alerted or warned in a manner similar to that in S34, and to S26 in which the assist torque TLK is made zero such that the lane-keeping-steering torque assist control is discontinued. With this, since the steering torque experienced by the vehicle driver is increased, this will become more noticeable to the driver. After the lane-keeping-steering torque assist control has thus been discontinued, the control will again be resumed when the vehicle driver gives the instructions to resume the control by, for example, operating a switch (not shown in the figures).

Having been configured in the foregoing manner in this embodiment, since the input to the yaw rate model is corrected by the conditions of road obtained by utilizing the navigation information such that the desired yaw rate is determined from the output of the model, the desired yaw rate can be determined more appropriately, thereby enabling to conduct the lane-keeping-steering torque assist control in a more appropriate manner.

Further, when the detected steering torque is greater or equal to the predetermined first torque, in other words, when the vehicle driver shows the positive intention to steer the vehicle by himself so as, for example, to avoid an obstacle on the road, the lane-keeping-steering assist torque is made zero. This makes it possible to better meet the wishes of the vehicle driver.

Further, when the detected steering torque is less than or equal to the predetermined second torque (in other words, when the vehicle driver grips the steering wheel with a slight force) and when the detected steering angle is greater or equal to the predetermined steering angle, estimating that the vehicle driver is relying upon the lane-keeping steering torque assist control to an excessive extent, the vehicle driver is alerted such that this is called to his attention. This makes it possible to prevent the vehicle driver from relying upon the lane-keeping-steering torque assist control to an excessive extent.

Further, since the alerting is conducted only when the time value exceeds the predetermined first time, this makes it possible to prevent unnecessarily alerting the vehicle driver or discontinuing the control when the vehicle driver excessively relies upon the control for a temporary or transitory period.

Further, since the lane-keeping steering assist torque is made zero when the timer value has exceeded the predetermined second time such that the steering torque experienced by the vehicle driver is increased, this makes it possible to better call the vehicle driver's attention.

The embodiment is thus configured to have a system for controlling steering of a vehicle (10), including: an actuator (electric motor 38) which steers driven wheels (32) of the vehicle; vehicle running condition detecting means (yaw rate sensor 82, wheel speed sensors 46, 50, steering angle sensor 44, SAS ECU 74, S10) for detecting running conditions of the vehicle including at least a turning behavior of the vehicle (yaw rate γ), a speed of the vehicle (V) and a steering angle of the vehicle (θ); steering torque detecting means (torque sensor 42, SAS ECU 74, S10) for detecting a steering torque (τh) inputted by a driver of the vehicle; road detecting means (CCD camera 64, image processing ECU 68, SAS ECU 74, S10) for detecting a road ahead of the vehicle on which the vehicle is running; desired vehicle turning behavior determining means (SAS ECU 74, S12) for determining a desired turning behavior of the vehicle (desired yaw rate γm) based on at least the detected steering angle and the detected vehicle speed using a preset model;

assist torque determining means (SAS ECU 74, S14–S38) for determining an error ($\Delta\gamma$) between the desired vehicle turning behavior and the detected vehicle turning behavior and for determining an assist torque (TLK) for causing the vehicle to run along the road based on the determined error, and manipulated variable determining means (EPS ECU 76) for determining a manipulated variable to be supplied to the actuator based on the determined assist torque. The system includes: road condition information outputting means (navigation information 88) for outputting information of conditions of the road including at least a curvature of the road; and steering angle correcting means (SAS ECU 74, S12) for correcting the detected steering angle ($\theta$) based on the detected road and the outputted information of the conditions of the road; and the desired vehicle turning behavior determining means determines the desired turning behavior of the vehicle based on at least the corrected steering angle ($\theta$) and the detected vehicle speed (V) using the preset mode the assist torque determining means includes: error discriminating means (SAS ECU 74, S22) for discriminating whether the determined error is a negative value; and torque discriminating means (SAS ECU 74, S24)) for discriminating whether the detected steering torque ($\tau h$) exceeds a predetermined first torque ($\tau href1$); and determines the assist torque to be zero when the determined error is discriminated to be a negative value and the detected steering torque is discriminated to exceed the predetermined first torque (SAS ECU 74, S26).

In the system, the assist torque determining means further includes: second error discriminating means (SAS ECU 74, S16) for discriminating whether the determined error ($\Delta\gamma$) in absolute value exceeds a reference value ($\gamma ref$); and determines the assist torque to be zero when the determined error is discriminated to be a negative value, the detected steering torque is discriminated to exceed the predetermined first torque and the determined error in absolute value is discriminated to exceed the reference value (SAS ECU 74, S22, S24, S26).

In the system, the assist torque determining means includes: error discriminating means (SAS ECU 74, S22) for discriminating whether the determined error is a negative value; torque discriminating means (SAS ECU 74, S28) for discriminating whether the detected steering torque ($\tau h$) exceeds a predetermined second torque ($\tau href2$); time measuring means (SAS ECU 74, S18, S22, S28) for beginning measurement of time lapse when the determined error is discriminated to be a negative value and the detected steering torque is discriminated to be less than or equal to the predetermined second torque; time discriminating means (SAS ECU 74, S32) for discriminating whether the measured time (T1) exceeds a predetermined first time (Tref1); and alerting means (SAS ECU 74, S34) for alerting the vehicle driver when the measured time is discriminated to exceed the predetermined first time.

In the system, the assist torque determining means further includes: steering angle discriminating means (SAS ECU 74, S30) for discriminating whether the steering angle ($\theta$) exceeds a predetermined steering angle ($\theta ref$); and the time measuring means begins the measurement of time lapse when the determined error is discriminated to be a negative value, the detected steering torque is discriminated to be less than or equal to the predetermined second torque and the steering angle is discriminated to exceed the predetermined steering angle (SAS ECU 74, S22, S28, S30).

In the system, the assist torque determining means further includes: error discriminating means (SAS ECU 74, S16) for discriminating whether the determined error ($\Delta\gamma$) in absolute value exceeds a reference value ($\gamma ref$); and the time measuring means begins the measurement of time lapse when the determined error is discriminated not to be a negative value, the detected steering torque is discriminated to be less than or equal to the predetermined second torque and the determined error in absolute value is discriminated to exceed the reference value (SAS ECU 74, S22, S28, S16).

In the system, the assist torque determining means further includes: second torque discriminating means (SAS ECU 74, S24) for discriminating whether the detected steering torque ($\tau h$) exceeds a predetermined torque ($\tau href1$); and the time measuring means begins the measurement of time lapse when the determined error is discriminated to be a negative value, the detected steering torque is discriminated to be less than or equal to the predetermined second torque and the detected steering torque is discriminated not to exceed the predetermined torque (SAS ECU 74, S22, S28, S24).

In the system, the assist torque determining means further includes: second time discriminating means (SAS ECU 74, S36) for discriminating whether the measured time (T2) exceeds a predetermined second time (Tref2); and determines the assist torque to be zero when the measured time is discriminated to exceed the predetermined second time (SAS ECU 74, S26).

In the system, the alerting means alerts the vehicle driver when the measured time (T2) is discriminated to exceed the predetermined second time (Tref2; SAS ECU 74, S38).

In the system, the vehicle turning behavior indicates a yaw rate of the vehicle ($\gamma$).

It should be noted that, although the vehicle turning behavior is determined by the yaw rate, this may be determined by the steering angle.

It should also be noted that, although the embodiment is configured such that the EPS ECU 76 determines or calculates the power-steering assist torque TPS, the SAS ECU 74 may instead conduct this determination or calculation. It should further be noted that, although various sensors are disposed on the vehicle 10, the sensors other than those necessary for achieving the claimed invention are not indispensable.

It should further be noted that, the steering angle sensor 44 and other sensors may be differently configured from that described in the foregoing and their locations are limited only by the need to provide the required values.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling steering of vehicle, comprising:
    an actuator which steers driven wheels of the vehicle;
    vehicle running condition detecting means for detecting running conditions of the vehicle including at least a turning behavior of the vehicle, a speed of the vehicle and a steering angle of the vehicle;
    steering torque detecting a means for detecting a steering torque inputted by a driver of the vehicle;
    road detecting means for detecting a lane boundary which defines a road on which the vehicle is running;
    road condition information outputting means for outputting information of conditions of the road including at least a curvature of the road;
    steering angle correcting means for correcting the detected steering angle based on the detected road and the outputted information of the conditions of the road;

desired vehicle turning behavior determining means for determining a desired turning behavior of the vehicle based on at least the corrected steering angle and the detected vehicle speed using a preset model;

assist torque determining means for determining an error between the desired vehicle turning behavior and the detected vehicle turning behavior and for determining an assist torque for causing the vehicle to run along the road based on the determined error; and manipulated variable determining means for determining a manipulated variable to be supplied to the actuator based on the determined assist torque.

2. A system according to claim 1, wherein the assist torque determining means includes:

error discriminating means for discriminating whether the determined error is a negative value; and torque discriminating means for discriminating whether the detected steering torque exceeds a predetermined first torque;

and determines the assist torque to be zero when the determined error is discriminated to be a negative value and the detected steering torque is discriminated to exceed the predetermined first torque.

3. A system according to claim 2, wherein the assist torque determining means further includes:

second error discriminating means for discriminating whether the determined error in absolute value exceeds a reference value;

and determines the assist torque to be zero when the determined error is discriminated to be a negative value, the detected steering torque is discriminated to exceed the predetermined first torque and the determined error in absolute value is discriminated to exceed the reference value.

4. A system according to claim 1, wherein the assist torque determining means includes:

error discriminating means for discriminating whether the determined error is a negative value;

torque discriminating means for discriminating whether the detected steering torque exceeds a predetermined second torque;

time measuring means for beginning measurement of time lapse when the determined error is discriminated to be a negative value and the detected steering torque is discriminated to be less than or equal to the predetermined second torque;

time discriminating means for discriminating whether the measured time exceeds a determined first time; and alerting means for alerting the vehicle driver when the measured time is discriminated to exceed the predetermined first time.

5. A system according to claim 4, wherein the assist torque determining means further includes:

steering angle discriminating means for discriminating whether the steering angle exceeds a predetermined steering angle;

and the time measuring means begins the measurement of time lapse when the determined error is discriminated to be a negative value, the detected steering torque is discriminated to be less than or equal to the predetermined second torque and the steering angle is discriminated to exceed the predetermined steering angle.

6. A system according to claim 4, wherein the assist torque determining means further includes:

error discriminating means for discriminating whether the determined error in absolute value exceeds a reference value;

and the time measuring means begins the measurement of time lapse when the determined error is discriminated not to be a negative value, the detected steering torque is discriminated to be less than or equal to the predetermined second torque and the determined error in absolute value is discriminated to exceed the reference value.

7. A system according to claim 4, wherein the assist torque determining means further includes:

second torque discriminating means for discriminating whether the detected steering torque exceeds a predetermined torque;

and the time measuring means begins the measurement of time lapse when the determined error is discriminated to be a negative value, the detected steering torque is discriminated to be less than or equal to the predetermined second torque and the detected steering torque is discriminated not to exceed the predetermined torque.

8. A system according to claim 4, wherein the assist torque determining means further includes:

second time discriminating means for discriminating whether the measured time exceeds a predetermined second time;

and determines the assist torque to be zero when the measured time is discriminated to exceed the predetermined second time.

9. A system according to claim 8, wherein the alerting means alerts the vehicle driver when the measured time is discriminated to exceed the predetermined second time.

10. A system according to claim 1, wherein the vehicle turning behavior indicates a yaw rate of the vehicle.

* * * * *

UNITED STATES PATENT AND TRADEMARK OFFICE
CERTIFICATE OF CORRECTION

PATENT NO.     : 6,256,561 B1
DATED          : July 3, 2001
INVENTOR(S)    : Nobuyoshi Asanuma It is certified that error appears in the above-identified patent and that said Letters Patent is hereby corrected as shown below:

Claim 4,
Line 50, change "determined" to -- predetermined --.

Signed and Sealed this

Twenty-sixth Day of March, 2002

*Attest:*

*Attesting Officer*

JAMES E. ROGAN
*Director of the United States Patent and Trademark Office*